Patented Apr. 17, 1951

2,549,600

UNITED STATES PATENT OFFICE 2,549,600

SYNTHESIS OF 5-(2-THENOYL)PENTANOIC ACID FROM THIOPHENE, ADIPYL CHLORIDE AND SILICA-ALUMINA CATALYST

Howard D. Hartough, Pitman, N. J., and Alvin I. Kosak, Columbus, Ohio, assignors to Socony-Vacuum Oil Company, Incorporated, a corporation of New York No Drawing. Application August 7, 1946, Serial No. 688,966

2 Claims. (Cl. 260—332.3)

This invention relates to a new and useful composition of matter, namely, 5-(2-thenoyl)pentanoic acid, having the formula:

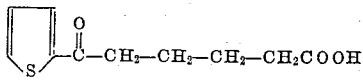

An object of this invention is the production of a compound which is useful as a solvent, an addition agent to mineral oil fractions, and an intermediate in the manufacture of plastic materials, pharmaceuticals and dyes.

It is well known that the halides of aliphatic dibasic acids react with aromatic compounds, such as benzene, to yield substituted paraffin hydrocarbons. Thus, it has been reported that adipyl chloride reacts with benzene to yield 1,4-dibenzoylbutane. While benzene is, in some respects, similar to thiophene, it has been found, in accordance with this invention, that the reaction of thiophene with adipyl chloride does not yield a disubstituted paraffin but gives rise to a new and useful chemical compound.

This invention is directed to said new compound, namely, 5-(2-thenoyl)pentanoic acid. This material, inherently characterized by the presence of a carboxy group, a ketonic group, and a heterocyclic group, serves as a useful intermediate in chemical synthesis and is particularly adapted, by reason of the presence in its structure of a thiophene ring and six-membered carbon chain terminating with an acid group, to serve as an intermediate in the production of plastics, drugs and dyes. Thus, the compound of this invention may be halogenated, nitrated, sulfonated, alkylated, etc., to yield useful chemical products.

The new compound of this invention is a light yellow crystalline material having a melting point of 79–80° C. and a neutralization number of 268. The latter figure is in good agreement with the calculated neutralization number for 5-(2-thenoyl)pentanoic acid of 264.

The following examples will serve to illustrate methods of preparing the new compound.

Example 1

To 50 grams (0.27 mole) of adipyl chloride and 84 grams (1 mole) of thiophene were added 5 grams of Super Filtrol clay. The reaction mixture was heated at 70–90° C. for 4.5 hours. After cooling, the clay was filtered off and the filtrate was washed with dilute sodium hydroxide solution until neutral. Acidulation of the water layer gave a mixture of product and adipic acid. A separation was effected by digestion with warm water to give 12 grams of light-yellow crystals. These were recrystallized by dissolving in 10 milliliters of ethyl acetate, treating with 1 gram of decolorizing charcoal and precipitating by addition of petroleum ether.

The light-yellow crystals melted at 79–80° C. Upon analysis, the sulfur content was found to be 15.02 per cent. The calculated sulfur content for 5-(2-thenoyl)pentanoic acid was 14.99 per cent. The semicarbazone of the product was prepared by standard procedure. After three crystallizations from alcohol, light-yellow crystals having a melting point of 200–201° C. were obtained. These crystals, upon analysis, were found to contain 14.9 per cent nitrogen. The calculated nitrogen content of the semicarbazone of 5-(2-thenoyl)pentanoic acid was 15.6 per cent.

Example 2

To a mixture of 84 grams (1 mole) of thiophene and 50 grams (0.27 mole) of adipyl chloride were added 3 grams of 85 per cent orthophosphoric acid. The mixture was heated progressively from 50 to 80° C. over a period of four hours. The mixture was then cooled to room temperature and washed with alkali solution until neutral. Upon treating the mixture as in the previous example, 20 grams of light-yellow crystals were obtained which melted at 79–80° C. A mixed melting point with the product of Example 1 showed no lowering, indicating the samples to be identical.

The process of this example is subject matter of copending application Serial Number 627,530, now Patent No. 2,458,520.

While in the above examples, Super Filtrol clay and phosphoric acid have been employed as catalysts in promoting the reaction of adipyl chloride and thiophene, 5-(2-thenoyl)pentanoic acid may likewise be obtained from said reaction promoted by various other materials, such as sulfuric acid, zinc chloride, iodine, hydriodic acid, boron trifluoride complex compounds, siliceous composites, including glauconite, synthetic gels of silica and one or more hydrous metal oxides, for example, alumina, zirconia, thoria, and the like.

We claim:

1. In a process for synthesizing 5-(2-thenoyl) pentanoic acid, the step comprising the reaction of thiophene and adipyl chloride in the presence of a silica-alumina catalyst.

2. A method for synthesizing 5-(2-thenoyl) pentanoic acid, comprising reacting thiophene and adipyl chloride in the presence of a silica-alumina catalyst, washing the resulting reaction product mixture with an aqueous alkaline solution and acidifying the water layer obtained as a result of said washing to yield 5-(2-thenoyl) pentanoic acid.

HOWARD D. HARTOUGH.
ALVIN I. KOSAK.

REFERENCES CITED

The following references are of record in the file of this patent:

UNITED STATES PATENTS

| Number | Name | Date |
|---|---|---|
| 2,458,519 | Kosak | Jan. 11, 1949 |

OTHER REFERENCES

Etaix: Ann. Chim. phys. (7) 9, 372–373 (1896).
Borsche, Ber. 45, 3715 (1912).
Beilstein, vol. X, supplement, page 338 (1932).
Richter: "Organic Chemistry," Wiley, 1938, pages 649–650.
Chemical Abstracts, 37, 1717[5] (1943).